United States Patent [19]

Wiesner

[11] 4,246,579
[45] Jan. 20, 1981

[54] ELECTROCHROMIC DISPLAY SWITCHING AND HOLDING ARRANGEMENT

[75] Inventor: Leo Wiesner, Kew Gardens, N.Y.

[73] Assignee: Timex Corporation, Waterbury, Conn.

[21] Appl. No.: 882,477

[22] Filed: Mar. 1, 1978

[51] Int. Cl.³ ............................................. G06F 3/14
[52] U.S. Cl. .................... 340/763; 340/784; 340/805; 350/357
[58] Field of Search ............... 340/785, 812, 813, 805; 350/357

[56] References Cited
U.S. PATENT DOCUMENTS 3,987,433  10/1976  Kennedy ........................ 340/785

FOREIGN PATENT DOCUMENTS 2650732  5/1977  Fed. Rep. of Germany ........... 350/357

*Primary Examiner*—Marshall M. Curtis

[57] ABSTRACT

A driving circuit for an electrochromic display cell wherein writing and erasing of electrode-segments are effected by relatively high write and erase transition potentials. After a predetermined transition period, the written and erased electrode-segments are stabilized at a desired coloration or transparency, respectively, by application of a maintaining write potential and a maintaining erase potential. The maintaining potentials are at a lower level than the respective transition potentials. In this manner, the write and erase charges or potentials on the electrode-segments are substantially maintained at a desired level to maintain the desired contrast ratio between the written and erased electrode-segment.

2 Claims, 5 Drawing Figures

DUTY CYCLE $\alpha L = \frac{1}{4}$
$f$ = INTERLEAVING FREQUENCY

ELECTROCHROMIC DISPLAY SWITCHING AND HOLDING ARRANGEMENT

FIELD OF THE INVENTION

This invention relates to a driving arrangement for passive electro-optic display devices, and in particular to a driving arrangement for an electrochromic display. Such electrochromic display cells can be utilized to display figures, letters, symbols and the like in a timepiece, calculator, meter or the like.

BACKGROUND OF THE INVENTION

In recent years, a great deal of interest has been shown in the provision of electrochromic displays having, for example, a digital or analog read out such as in commonly assigned U.S. Pat. No. 3,908,355 issued Sept. 30, 1975 in the name of Leo Wiesner and U.S. Pat. No. 3,987,433 issued Oct. 19, 1976 in the name of Richard Howard Kennedy.

Other prior art patents of interest includes U.S. Pat. No. 3,932,860 issued Jan. 13, 1976 to Sam G. Cohen, U.S. Pat. No. 3,881,311 issued May 6, 1975 to Tetsuro Hama et al, U.S. Pat. No. 3,797,225 issued Mar. 19, 1974 to Tetsuro Hama et al, U.S. Pat. No. 3,949,242 issued Apr. 6, 1976 to Masataka Hirasawa et al, U.S. Pat. No. 3,807,832 issued Apr. 30, 1974 to George Augustus Castellion and U.S. Pat. No. 3,839,857 issued Oct. 8, 1974 to Donald Joseph Berets et al. These prior art patents are merely typical of the art showing passive electro-optic display devices and other pertinent references may exist.

From the prior art, it is known to write selected segments by applying a voltage of one potential (usually having a negative polarity) with respect to a common electrode for a period to completely write the selected segments and then removing said potential from the written segments. Similarly, erasing of a segment was effected by applying a voltage of opposite polarity with respect to the common electrode for a period to completely erase the selected segments and thereafter removing said voltage.

Thus, the written and erased electrode-segments were open-circuited upon completion of each transition period, relying on the inherent memory or "persistent electrochromism" of the electrochromic layer to maintain its charge-potential and, therefore, its state of coloration and transparency, respectively.

SOME OF THE PROBLEMS RECOGNIZED AND SOLVED BY THE PRESENT INVENTION

It was determined that the open-circuited electrode-segments utilized in the prior art driving arrangements tend to gain or lose charge as a result of leakage and, therefore, tend to slowly fade (if written) or to color (if erased).

With continuous application of the write voltage to a written electrodesegment, the color becomes so dark as to make it very difficult to erase. And leaving the erase voltage connected for a prolonged period, such as to the hour or day/date indicia, may result in a shortening of the useful life of the display.

SUMMARY OF THE INVENTION

Generally speaking, in accordance with the invention, a driving arrangement for an electrochromic display is provided having means for applying a transition potential across the segment(s) to be written ($V_{wt}$) and/or erased ($V_{et}$) for approximately a predetermined transition period after which maintaining potentials, i.e., $V_{wm}$ and $V_{em}$, are applied to the written and/or erased segment(s) to substantially maintain the desired potential or charge on said segment(s). The respective transition and maintaining voltage-potentials are selected such that $V_{wt} > V_{wm}$ and $V_{et} > V_{em}$.

It is therefore an object of the present invention to provide an electrochromic display means which maintains a desired level of segment coloration over extended periods of time.

It is a further object of the invention to provide an electrochromic display means which maintains a desired state of segment transparency.

It is a further object of the invention to provide means for energizing an electrochromic display which minimizes undesirable electro-chemical reactions leading to degradation of the display.

It is a further object of this invention to provide an improved electrochromic display means for substantially maintaining a desired contrast ratio between written and erased electrode-segments.

Another object of this invention is to provide means for maintaining a substantially constant charge on a written and/or erased electrochromic layer(s) of an electrochromic display.

Another object of this invention is to provide a method of applying a plurality of potentials to an electrochromic display which improves the appearance of the display.

It is still a further object of this invention to provide an improved method of applying potential to an electrochromic display for substantially maintaining the coloration and/or transparency of the display segments.

These and other objects and features of the present invention will be apparent from the description of the preferred embodiment of the invention, taken in conjunction with the accompanying drawings, in which.

Figure 2:
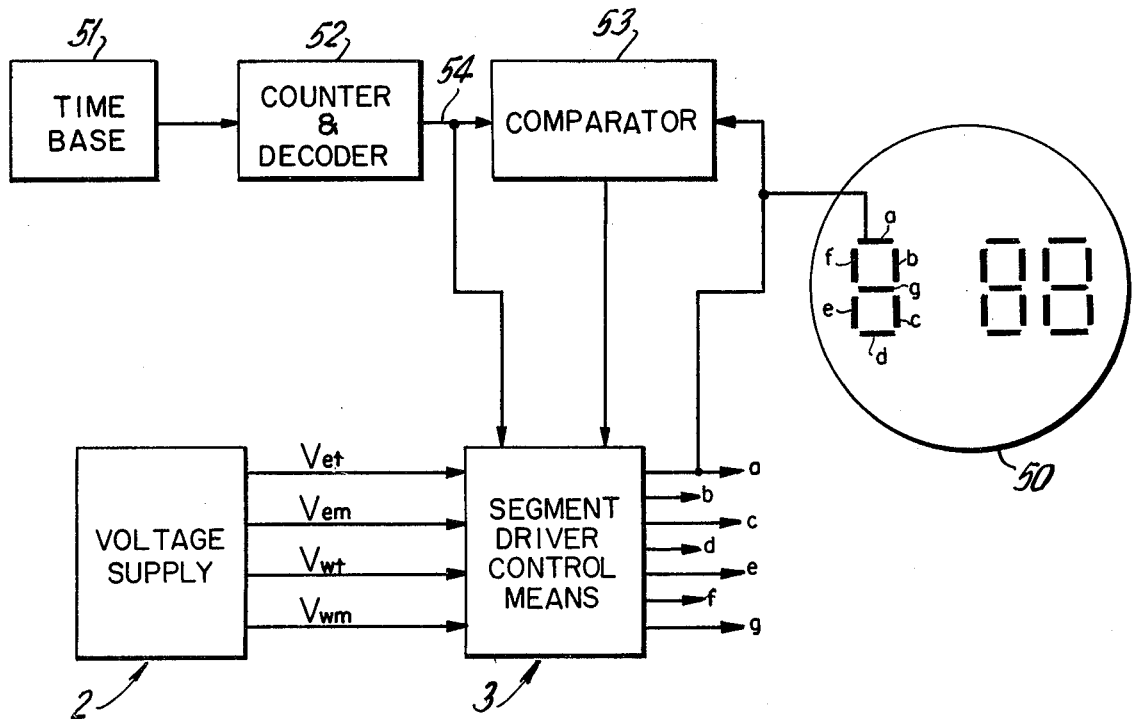
FIG. 2 is a circuit diagram of one embodiment of the driving arrangement in accordance with the invention.
Figure 3:
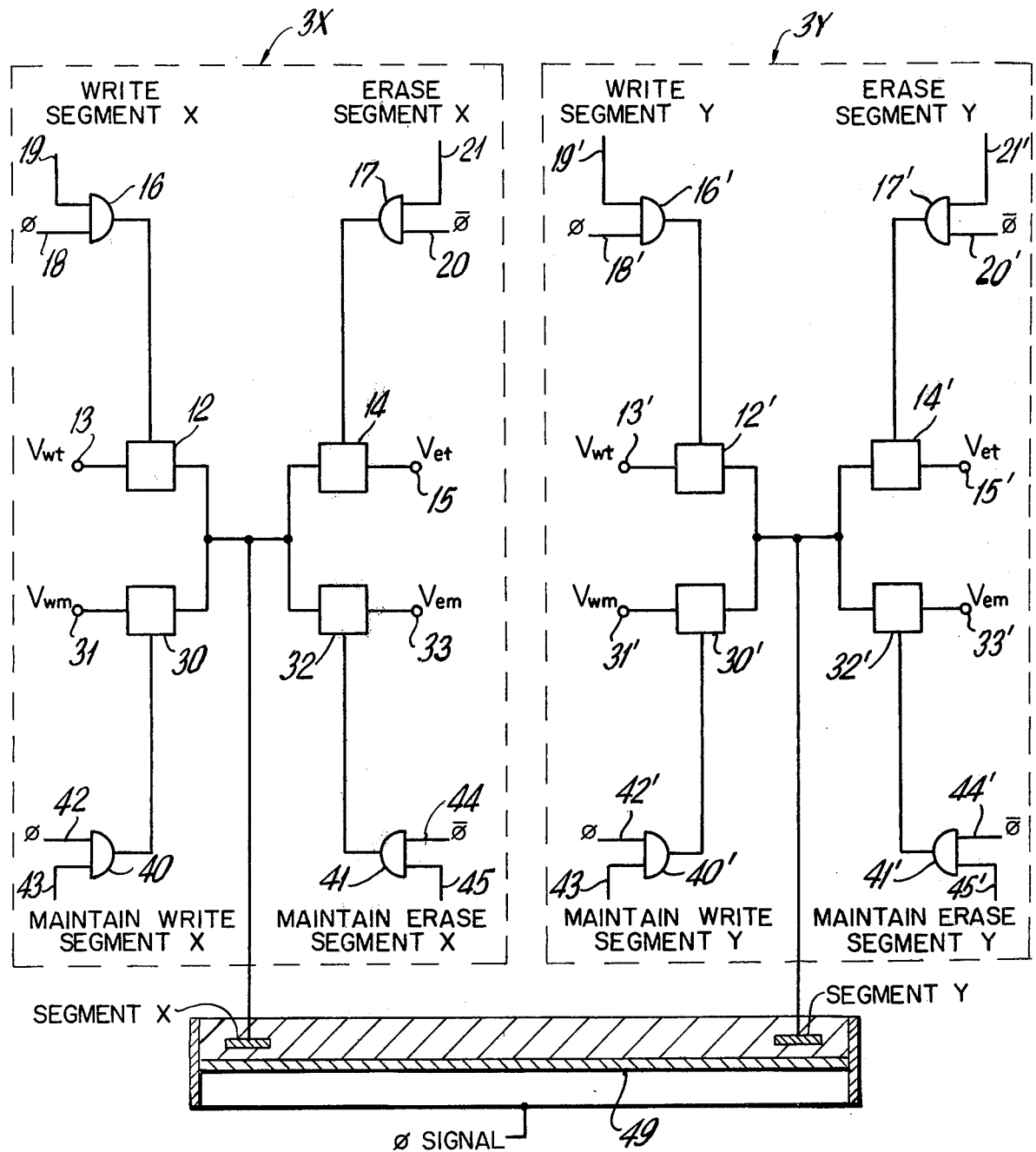
FIG. 3 is a circuit diagram of a second embodiment of the driving arrangement in accordance with the invention.
Figure 4:
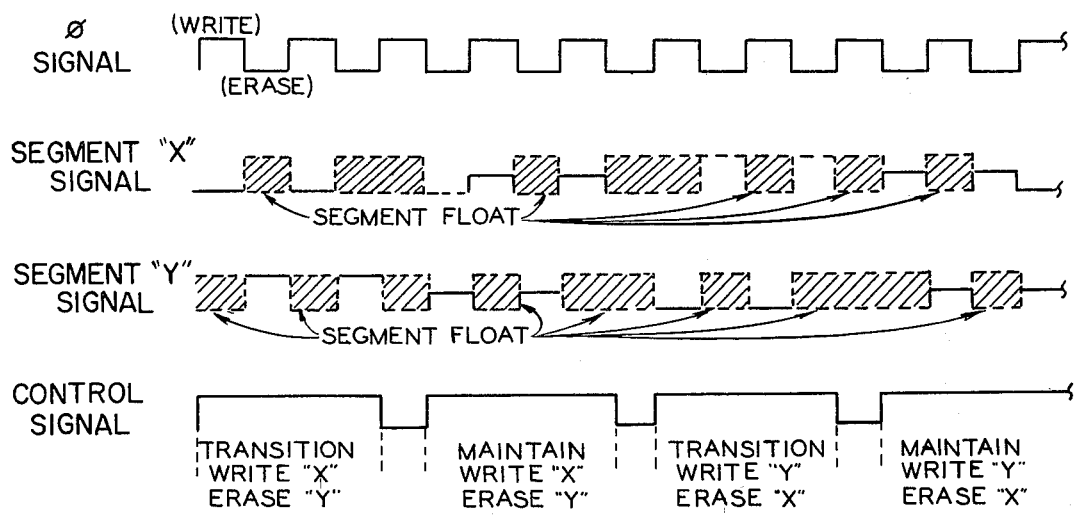
Figure 5:
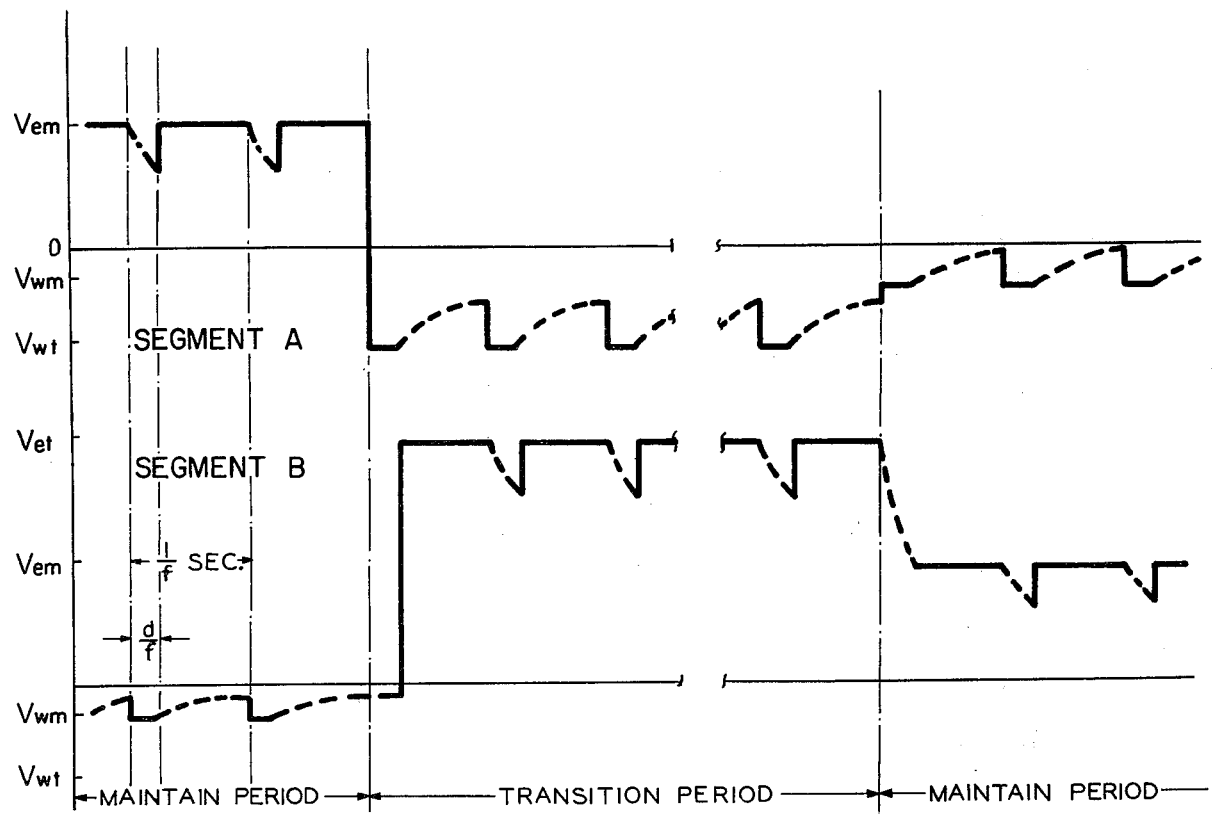

FIG. 4 is a pulse train diagram illustrating the relation of the activation and maintenance periods of the pulses applied to the circuit shown in FIG. 3; and FIG. 5 is a wave form diagram illustrating the potentials applied across, for example, any two segments X, Y of an EC display as shown in FIG. 3 and also the potentials applied to the segments A and B illustrated in FIG. 2 to update or change the indicia or information being displayed by a seven segment display indicia arrangement.

DETAILED DESCRIPTION OF THE INVENTION

Figure 1:
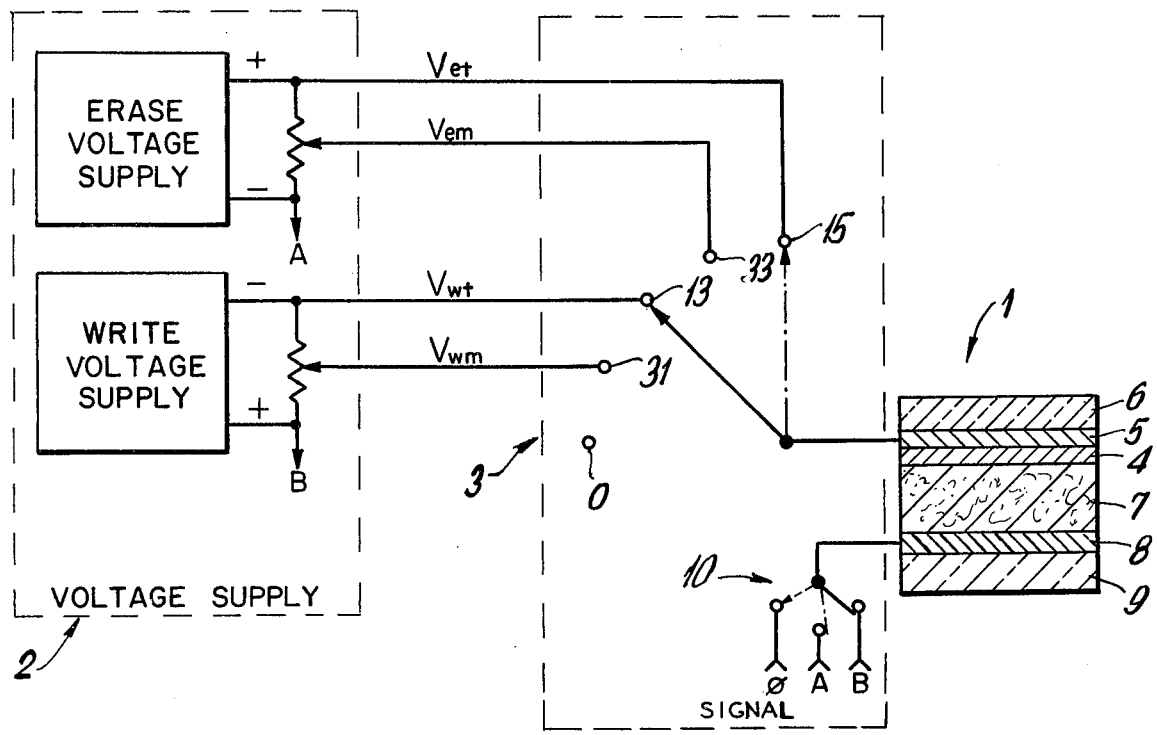
FIG. 1 is a circuit diagram illustrating the driving arrangement in accordance with the invention for a passive display element.

Referring now to FIG. 1 of the drawings, the preferred embodiment of the present invention comprises an electrochromic display structure 1 being actuated from a multiple voltage supply 2 by means of a switch device or segment driver control means 3. The essential elements of the electrochromic display (ECD) comprises an electrochromic (EC) layer or segment 4 deposited on an electrode 5 formed on a glass substrate 6 such as commercially available NESA glass, an electrolyte-separator layer 7 contacting the EC layer 4 and a counterelectrode 8. The counterelectrode 8 is formed, for example, by oxidizing and partial reducing of tungsten on a glass or ceramic substrate 9. To enhance contrast between the colored and uncolored states, a pigment may be added to the electrolyte-separator layer 7. White $T_iO_2$ pigment is suitable.

The display is preferably an electrochromic device using a well known phenomenon such as is described in U.S. Pat. Nos. 3,704,057 issued Nov. 28, 1972 to Lindley Clair Beegle, 3,708,220 issued Jan. 2, 1973 to M. Meyers and T. Augurt and 3,807,832 issued Apr. 30, 1974 to George Castellion.

Briefly stated, these electro-optical devices exhibit the phenomenon whereby the light absorbing ability of the activated area is varied by the application of an electric voltage to the electrochromic material turning it darker, for example, decreasing its light transmitting ability over the area of the electrode-segment activated. Generally, application of a voltage of one polarity, for example, negative with respect to the counterelectrode, to the electrochromic layer causes it to increase its light absorption, i.e, to turn darker or write. Application of a voltage of opposite polarity causes bleaching or erasing. The activated electrode-segment retains, in a memory-like manner this varied light absorbing characteristic written or erased for a period of time until the application of a voltage of opposite polarity.

Typically in the prior art after writing or erasing, the written or erased segment-electrode was disconnected from the writing or erasing potentials and allowed to float. However, loss of charge on the segments may result causing fading of the written segments and/or coloration of the erased segments.

This undesirable characteristic of the prior art electrochromic display devices can result in the lowering of the contrast ratio between the written and erased segments causing a less distinctive display.

In accordance with the present invention, a driving arrangement is provided for an electrochromic display cell 1 wherein writing or erasing of a segment(s) 4 is effected by the application of a (relatively high) transition write voltage $V_{wt}$ or transition erase voltage $V_{et}$ respectively. Transition voltages/potentials are selected so as to effect transition, i.e., coloration or bleaching, as rapidly as possible without causing undesirable electrochemical reactions leading to degradation of the display. After the transition period, which is predetermined to effect substantially adequate coloration or bleaching of the segment 4, the written or erased segment 4 is stabilized or maintained at a desired state of coloration or transparency by the application of a maintaining write voltage $V_{wm}$ or a maintaining erase voltage $V_{em}$. The maintaining voltages $V_{em}$, $V_{wm}$ which are at a lower potential level with respect to the counterelectrode than the respective transition voltages $V_{wt}$, $V_{et}$ are chosen such that the write or erase charge on the segment 4 is substantially maintained at the desired level and, therefore, maintains the coloration or transparency of the segment 4. In this manner, an equilibrium is substantially effected whereby a loss of charge on a segment is replenished to, thereby, substantially maintain the desired level of segment coloration and/or transparency.

In operation, if segment 4 is to be written, a transition write voltage $V_{wt}$ is applied, as shown, to the electrode 5, via switches 3 and 10, making the EC layer 4 negative with respect to the common electrode 8, for a predetermined (write) transition period. The transition period is selected, either empirically or by calculation, to cause segment 4 to turn substantially to the desired darkness. After the predetermined transition write period, the segment 4, via switch 3, is disconnected from the transition write voltage $V_{wt}$ and is then coupled to the maintain write voltage $V_{wm}$ to maintain the desired perceived darkness or coloration of the segment 4.

If segment 4 is to be erased, electrode 5 is disconnected from the maintain write voltage $V_{wm}$ and coupled, via switches 3 and 10, shown in dotdash lines, to the transition erase voltage $V_{et}$, making the EC layer 4 positive with respect to the common electrode 8, for a predetermined transition (erase) period. After the predetermined transition erase period, the electrode 5, via switch 3, is disconnected from the transition erase voltage $V_{et}$ and is then coupled to the maintain erase voltage $V_{em}$ to maintain the desired perceived transparency or unwritten state of segment 4.

Switch 3, although illustrated as a manually actuatable switch may comprise electronic switching means well known in the art. Switch 10 is shown for illustrative purposes only to facilitate understanding. The device will operate properly if switch 10 is omitted, and points A, B and the common electrode 8 are connected together.

Referring now to FIG. 2, a block diagram of the electronic circuitry for a timepiece embodiment of this invention is shown. The electrochromic display 50 is actuated by electronic circuitry which generally consists of a time base 51, counter and decoder section 52 and a display driver 3. In the embodiment illustrated in FIG. 2, the multiple voltage supply 2 provides four separate voltage levels $V_{wt}$, $V_{wm}$, $V_{et}$ and $V_{em}$ to each of a plurality of segment drive control means 3 for selectively energizing the segments, for example a through g of each display. The segment drive control means 3 may take the form of a plurality of transistor switches which are responsive to control signals from the comparator 53. The comparator 53 is provided for sensing the state, i.e. written or erased, of each segment-electrode a through g of the display indicia and compares same with the counter and decoder 52 (segment) command signal 54 to avoid reapplication of a transition voltage to a segment which is required to be maintained in the desired written or erased state called for by the command signal 54. The comparator 53 by comparing the command signal 54 from the decoder 52 with the state of the segment to be written or erased, controls the segment driver control means 3 to apply the proper voltage potentials to the selected electrode to either write, erase or maintain the selected segment in the desired state. The comparator may take the form of an operational amplifier known to those skilled in the art.

During updating (i.e. change of display) the writing of segments previously erased and the erasing of segments previously written may be alternated at a rapid rate between 2 Hz and 4 KHz, to effect substantially simultaneous fade-in and fade-out of segments undergoing change. This procedure, in accordance with the teaching of U.S. Pat. No. 3,987,433 issued Oct. 19, 1976 to Richard Howard Kennedy, the teachings of which are herein incorporated by reference, minimizes ambiguity or display of meaningless characters as explained in detail in referenced patent.

Briefly stated, the writing and erasing (transition) voltages, i.e. $V_{wt}$ and $V_{et}$, are applied alternately in rapid succession during time intervals which are short compared to those required for complete writing or erasing. In each of these several successive intervals, only partial writing or erasing is achieved. The transition voltage-potentials are applied across the selected segments for a time interval called the transition period. Each application of a write or erase voltage-potential effects only incomplete writing or erasing. However, the effect is cumulative, and writing and erasing are perceived to occur simultaneously, minimizing the display of meaningless symbols.

In a display so operated, a switch 3 as shown in FIG. 1 is provided for each segment. Consider two segments, designated in FIG. 3 respectively as X and Y, where X is to be written and Y is to be erased. The associated switches are designated as 3X and 3Y respectively. Assume that the interleaving frequency is 32 Hz. Then switch 3X couples terminal 13 to segment X for a time K T, where T=1/32 second and K is a fraction less than 1. During this K T interval, segment X is partially written at the write transition voltage $V_{wt}$. During the same interval switch 3Y is coupled to a terminal position O, i.e., gates 12', 30', 14' and 32' are open, disconnecting segment Y. Then during the remainder (1-K) T of the period T switch 3X is placed in position O, i.e. gates 12, 30, 14 and 32 are open, and switch 3Y couples terminal 15' to segment Y, causing partial erasure of segment Y at the erase transition voltage $V_{et}$. The process is repeated during successive periods T, achieving progressive coloration of segment X and bleaching of segment Y. After the transition period (typically 0.5 to 2 seconds), coloration of X has progressed to the desired contrast ratio and bleaching of Y is complete. The regime is now changed to the maintain condition. During the interval K T, switch 3X couples terminal 31 to segment X for maintaining segment X at the desired contrast ratio, while switch 3Y is coupled to terminal position O, disconnecting or floating segment X. Then during interval (1-K) T, switch 3X is coupled to terminal position O, floating segment X, while switch 3Y is coupled to terminal position 33', maintaining segment Y in the bleached state. This maintaining regime continues until a command from the counter-decoder mandates a change in the condition of the segments.

The arrangement of FIG. 1 uses separate write and erase voltage supplies. A circuit using only one voltage supply and employing switching of the common electrode with a square wave signal of duty cycle K (as above defined) and appropriate amplitude is depicted in FIG. 3. Two segments, X and Y are shown, and corresponding elements carry the same number designations, with unprimed numbers being used for segment X and primed numbers being used for segment Y. Each segment (for instance segment X) is connected to four switches, such as transmission gates 12, 30, 14 and 32, which respectively allow coupling that segment to the write transition voltage $V_{wt}$, the write maintain voltage $V_{wm}$, the erase transition voltage $V_{et}$ and the erase maintain voltage $V_{em}$. These voltages are obtained from a single voltage supply, for instance by a voltage divider (not shown). The values of these voltages are so chosen with respect to the high and low levels $V_H$ and $V_L$ respectively of the square wave $\phi$, that the appropriate voltage differences exist between a segment and the back electrode to effect the desired write or erase transition or maintain voltages. Suitable values are:

| | | |
|---|---|---|
| $\phi$ at $V_H$ : | Write Transition: | $V_{wt} - V_H \approx -0.35$ Volt |
| $\phi$ at $V_H$ : | Write Maintain: | $V_{wm} - V_H \approx -0.1$ Volt |
| $\phi$ at $V_L$ : | Erase Transition: | $V_{et} - V_L \approx +0.8$ Volt |
| $\phi$ at $V_L$ : | Erase Maintain: | $V_{em} - V_L \approx +0.4$ Volt |

Note that when $\phi$ is high (at $V_H$) a segment connected to either $V_{wt}$ or $V_{wm}$ is negative with respect to the common electrode 49 and will color. When $\phi$ is low (at $V_L$) a segment connected to either $V_{et}$ or $V_{em}$ is positive with respect to the common electrode 49 and will bleach. Note also that the potentials appearing between a segment and the common electrode are significantly smaller for the maintain condition than for the transition condition, whether it be in a write or erase mode.

Transmission gates 12, 14, 30 and 32 are respectively controlled by two-input AND gates 16, 17, 40 and 41, and are conducting when the output of these gates is at logic 1 (high); otherwise they are open.

Inputs 18 and 42, respectively, of gates 16 and 40 are connected to the square wave voltage $\phi$, while inputs 20 and 44, respectively, of gates 17 and 41 connected to $\bar{\phi}$ which is 180 degrees out of phase with $\phi$. The second input 19 of gate 16 is connected to signal means commanding a write transition, by making line 19 go high (for instance a decoder). The second input 43 of gate 40 is connected to signal means commanding a write maintain condition by making line 43 go high. Similarly, the second input 21 of gate 17 is connected to signal means commanding an erase transition. The second input 45 of gate 41 is connected to signal means commanding the erase maintain condition.

In operation, if segment X is to be written and segment Y to be erased, the appropriate write and erase transition command lines 19 and 21' to go high. Then when $\phi$ goes high (to $V_H$), the output of AND gate 16 goes high, closing gate 12 and applying $V_{wt}$ to segment X, causing it to start coloring since it is now at negative voltage with respect to common electrode 49. All other gates connected to X are open: gate 30 because input 43 of AND gate 40 is low; gates 14 and 32 because inputs 20 and 44 of AND gates 17 and 41 respectively are at $\bar{\phi}$, which is low at this instant. Similar conditions show that all of the gates 12', 30', 14' and 32' are open, leaving segment Y disconnected.

When $\phi$ goes low, gate 12 opens and segment X is disconnected. Since line 21' is high and $\bar{\phi}$ is high, gate 14' closes and connects segment Y to $V_{et}$, causing it to start bleaching.

The process continues during the transition period, until adequate contrast is reached on segment X and bleaching is complete on Y.

When the maintain regime begins, line 43 goes high, while line 19 goes low. During the time when $\phi$ is high (at $V_H$), segment X is connected to $V_{wm}$ via gate 30, while segment Y is floating. Then, when $\bar{\phi}$ goes high ($\phi$ at $V_L$) segment X is disconnected and segment Y is coupled to $V_{em}$ via gate 32, because line 43 is high. This regime continues until a command signal for a change is received from the decoder and comparator.

Sketches of the voltage wave forms appearing at segments during transition and maintain conditions are shown in FIG. 5.

The frequency of the $\phi$ and, therefore, the $\bar{\phi}$ signal, i.e. the interleaving frequency fi, is predetermined such that during a cycle thereof the write and erase transition potentials provided have duration or duty-cycle such that only partial or incomplete writing and erasing of the selected segments are effected. Therefore, the segments to be written and erased are caused to partially fade-in and fade-out, respectively, during each cycle of the $\phi$ and $\bar{\phi}$ signals, and to completely fade-in and fade-out after several cycles so as to give the appearance of simultaneous transition or update of the display characters.

What is claimed is:

1. A switching and holding circuit for an electrochromic display cell having at least one segment and a common electrode comprising:

circuit means for providing a command transition write signal and a command maintain write signal and a common transition erase signal and a command maintain erase signal;

alternating signal means for providing to said common electrode an alternating signal having a write signal level and an erase signal level, said alternating signal having a period substantially shorter than that of any of said command signals, whereby said command signals may be modulated as a series of pulses.

means coupled to said circuit means and to said alternating signal means and controlled by said command transition write signal and said write signal level to provide a plurality of transition write voltage pulses to said segment in coincidence with said write signal level being applied to said common electrode for providing a transition write potential between said common electrode and said segment, said means also being controlled by said command maintain write signal and said write signal level to provide a plurality of maintain write voltage pulses to said segment in coincidence with said write signal level being applied to said common electrode for providing a maintain write potential between said common electrode and said segment, said means also being controlled by said command transition erase signal and said erase signal level to provide a plurality of transition erase voltage pulses to said segment in coincidence with said erase signal level being applied to said common electrode for providing a transition erase potential between said common electrode and said segment, said control means also being controlled by said command maintain erase signal and said erase signal level to provide a plurality of maintain erase voltage pulses to said segment in coincidence with said erase signal level being applied to said common electrode for providing a maintain erase potential between said common electrode and said segment.

2. A switching and holding circuit as in claim 1, wherein:

the electrochromic display cell exhibits coloration and bleaching by control of the polarity of a transition electric field for a substantially predetermined duration and exhibits substantially stabilized states of coloration and bleaching by control of the polarity of a maintain electric field;

the alternating signal comprises a square wave signal which varies between said write signal level and said erase signal level and having a period that each said write signal level has a duration that said transition write potential is applied for a duration which is less than the predetermined duration required to effect a predetermined coloration and each erase signal level has a duration that said transition erase potential is applied for a duration which is less than the predetermined duration required to effect complete bleaching;

the circuit means selectively provides a command transition write signal and a command transition erase signal having a duration to enable said switch means over a several cycle duration of the alternating signal to selectively substantially effect a complete coloration or a complete bleaching of the segment.

* * * * *